(12) United States Patent
Bakos (10) Patent No.: US 10,507,866 B2
(45) Date of Patent: Dec. 17, 2019

(54) ELECTRIC POWER STEERING SYSTEM WITH RIPPLE COMPENSATION

(71) Applicants: THYSSENKRUPP PRESTA AG, Eschen (LI); thyssenkrupp AG, Essen (DE)

(72) Inventor: Dezső Bakos, Budapest (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 131 days.

(21) Appl. No.: 15/572,586

(22) PCT Filed: May 11, 2015

(86) PCT No.: PCT/EP2015/060362
§ 371 (c)(1),
(2) Date: Nov. 8, 2017

(87) PCT Pub. No.: WO2016/180469
PCT Pub. Date: Nov. 17, 2016

(65) Prior Publication Data
US 2018/0127022 A1 May 10, 2018

(51) Int. Cl.
*B62D 5/04* (2006.01)
*H02P 6/10* (2006.01)

(52) U.S. Cl.
CPC ......... *B62D 5/0463* (2013.01); *B62D 5/0472* (2013.01); *H02P 6/10* (2013.01)

(58) Field of Classification Search
CPC .... B62D 5/0463; B62D 5/046; B62D 5/0472; H02P 29/50; H02P 6/10
See application file for complete search history.

(56) References Cited

U.S. PATENT DOCUMENTS 6,396,229 B1 * 5/2002 Sakamoto ................. H02P 6/18
318/400.02
6,639,380 B2 * 10/2003 Sul ........................ H02P 21/24
318/700

(Continued)

FOREIGN PATENT DOCUMENTS

CN 103079933 A 5/2013
CN 103326652 A 9/2013

(Continued)

OTHER PUBLICATIONS

English Translation of International Search Report issued in PCT/EP2015/060362, dated Feb. 1, 2016 (dated Feb. 12, 2016).

Primary Examiner — Joseph M Rocca
Assistant Examiner — Michael R Stabley
(74) Attorney, Agent, or Firm — thyssenkrupp North America, Inc.

(57) ABSTRACT

An electric power steering apparatus may be employed to assist steering of a motor vehicle by conferring torque generated by an electric motor to a steering mechanism. The apparatus may include a steering controller that receives signals representative of vehicle velocity and torque applied to a steering wheel and a rotor position signal to derive a target motor torque, a motor controller that receives the target motor torque from the steering controller and transfers the target motor torque into target voltages expressed in a coordinate system fixed to a stator, and an inverter that transforms the target voltages into motor currents. The apparatus may further include a ripple compensation unit that compensates the target voltages for a (n−1)-th harmonic current by adding compensation voltages to the target voltages.

8 Claims, 4 Drawing Sheets

(56) References Cited

U.S. PATENT DOCUMENTS

| | | | |
|---|---|---|---|
| 7,071,651 B2* | 7/2006 | Toyozawa | H02P 6/183 |
| | | | 318/801 |
| 7,723,944 B2* | 5/2010 | Kitanaka | H02P 21/02 |
| | | | 318/800 |
| 7,952,308 B2* | 5/2011 | Schulz | H02P 6/10 |
| | | | 318/400.07 |
| 8,180,529 B2* | 5/2012 | Suzuki | B62D 5/0472 |
| | | | 180/444 |
| 2007/0085508 A1 | 4/2007 | Fujitsuna et al. | |
| 2007/0205041 A1* | 9/2007 | Nishizaki | B62D 5/0472 |
| | | | 180/446 |
| 2008/0067960 A1* | 3/2008 | Maeda | B62D 5/046 |
| | | | 318/400.02 |
| 2008/0296085 A1* | 12/2008 | Suzuki | B62D 5/046 |
| | | | 180/444 |
| 2011/0248656 A1 | 10/2011 | Yabuguchi | |
| 2014/0210388 A1* | 7/2014 | Ito | H02P 6/10 |
| | | | 318/400.2 |
| 2014/0265962 A1 | 9/2014 | Gebregergis | |
| 2014/0346984 A1* | 11/2014 | Shiota | H02P 6/183 |
| | | | 318/400.02 |
| 2014/0375240 A1* | 12/2014 | Kawashima | H02P 27/085 |
| | | | 318/400.24 |
| 2015/0333687 A1* | 11/2015 | Itani | H02P 27/08 |
| | | | 318/504 |

FOREIGN PATENT DOCUMENTS

| | | |
|---|---|---|
| EP | 2000389 A | 12/2008 |
| EP | 2012425 A | 1/2009 |

* cited by examiner

ELECTRIC POWER STEERING SYSTEM WITH RIPPLE COMPENSATION

CROSS REFERENCE TO RELATED APPLICATION

This application is a U.S. National Stage Entry of International Patent Application Serial Number PCT/EP2015/060362, filed May 11, 2015, the entire content of which is incorporated herein by reference.

FIELD

The present disclosure generally relates to electric power steering systems and methods for eliminating torque ripple and suppressing vibrations and noises without affecting dynamic behavior of a motor.

BACKGROUND

An electric power steering (EPS) system provides an electric motor coupled to the steering gear and responsive to driver torque input through the steering column to provide power assistance. An electronic control unit with an inverter controls the motor. To fulfil the adequate power assistance a target motor torque is calculated responsive to the driver torque input. The inverter feeds the motor with phase currents for torque generation with either a subharmonic method, space vector modulation or a hysteresis current controller. As result a harmonic and nonharmonic disturbance spectrum in the phase currents and/or the drive torque is generated. This spectrum is undesirable because it leads to acoustic anomalies and torque anomalies in the overall steering system. The described phenomenon is known as torque ripple and it is caused by deviations of the induced electric fields from a sinusoidal shape or not ideal behaviour of current measurement offset or gain errors. Even when the torque ripple is made sufficiently small, that it would not be considered a problem in most applications, the motor output in many EPS systems is provided to a steering component closely coupled to the operator handwheel; and even small torque ripple and housing vibrations can be felt and/or are audible by the vehicle operator in high torque assist steering modes such as low speed parking manoeuvres.

In some EPS the drive torque of the motor will be controlled in a feedback loop to the demand motor torque. The control loop uses a target motor torque processing the control operation. The target motor torque is often also called a reference motor torque. Demand, target and reference will be used as a synonym in this document. Nevertheless the demand motor torque and the target motor torque are not static values. The demand motor torque and the target motor torque are dynamic values depending on the driver torque input and perhaps other input values.

Therefore, in order to suppress vibration and noise generated by the motor or other components in the EPS, various countermeasures are conventionally taken in accordance with the cause of the vibration and noise. For example, the European patent EP 2 000 389 B1 discloses an electric power steering apparatus including a steering force assist device, which applies to the steering system an assist force for assisting a steering operation of a steering wheel in a vehicle steering system, and a control means for controlling actuation of the steering force assist device. The control means includes attenuating means, which attenuate a specific frequency component in accordance with the rotational angular velocity of the motor in order to reduce torque ripples of order components and suppress generation of vibration and noise. However, this procedure is complex and affects the dynamic behaviour of the motor.

Thus a need exists for an electric power steering apparatus that easily and accurately reduces torque ripples and effectively suppresses generation of vibration and noise, with less limiting the dynamic behaviour of the motor in relation to the prior solutions.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The example electric power steering apparatuses disclosed herein may be employed, amongst other reasons, to assist steering of a motor vehicle by conferring torque generated by an electric motor to a steering mechanism by a rotation of a rotor of the motor in relation to a stator. Further, some example apparatuses may comprise:

a steering controller which receives signals representative of at least the torque applied to a steering wheel and determining a target motor torque, a motor controller comprising a first control portion which receives the target motor torque from the steering controller and an electrical angular frequency of the rotor and transfers the target motor torque into target currents expressed in a coordinate system fixed to the electrical angular frequency of the rotating rotor, the motor controller comprises a coordinate transformation portion to transfer the target currents into target voltages expressed in a coordinate system fixed to the stator and an inverter which transforms the target voltages into motor currents and the apparatus further comprises at least one ripple compensation unit which determines compensation voltages and an adder to add the compensation voltages to the target voltages, wherein the at least one ripple compensation unit comprises a first ripple control portion which receives the target motor torque from the steering controller and an angular frequency of the rotor to transfer the target motor torque into compensation currents expressed in a coordinate system fixed to a rotating part, rotates n-times higher than the electrical angular frequency, the at least one ripple compensation unit comprises a ripple coordinate transfer portion to transfer the compensation currents into compensation voltages expressed in a coordinate system fixed to the stator and output the compensation voltages to the adder.

Preferably, the at least one ripple compensation unit comprises a coordinate transformation which transforms the motor currents into a two-dimensional rotating reference frame (d-q) fixed to the n-times of the electrical angular frequency of the rotor of the motor. The d-q-coordinate axes are orthogonal to each other.

It is further favoured that the at least one ripple compensation unit comprises at least one low-pass-filter, whereby one low-pass-filter component is provided for the d-component and one low-pass-filter component is provided for the q-component of the compensation currents.

Preferably, the at least one ripple compensation unit comprises two look-up tables, in which compensation reference signals are stored. The compensation reference signal should be the compensation current, determined in a coordinate system fixed to the rotating rotor of the electric motor and has a d-component and a q-component, like the target motor current. Preferably each look up table consists of columns of a number of threshold values of electrical angular frequencies and of rows of a number of threshold values of target motor torque values. The matrix of the look up table contains predetermined appropriate compensation currents as result of the actual electrical angular frequency and the actual target motor torque. One of the look-up tables presents the d-currents, and the other look-up table presents the q-currents. When the value of the actual target motor torque is between two rows and/or the actual electrical angular frequency is between two columns an interpolation operation is done to determine the compensation current.

As alternative to the look-up tables a calculation function to determine the d-current and the q-current of the compensation current is possible.

As alternative for using the electrical angular frequency the mechanical rotor rotational speed is also applicable.

Preferably the interpolation is a linear interpolation.

In one preferred embodiment, the at least one ripple compensation unit comprises at least one unit to convert compensation currents into the compensation voltages expressed in the stator fixed coordinate system.

Preferably, the inverter comprises a single-shunt resistor to reconstruct the motor currents.

Another embodiment comprises essentially the same elements but the ripple compensation unit produces an arbitrary given electrical angular frequency to be added to the target voltages or which eliminates an arbitrary given electrical angular frequency from the target voltages.

Furthermore, some example methods of the present disclosure comprise the following steps:
receiving a signal representative of a torque applied to a steering wheel,
determining a target motor torque on the basis of the received signal,
transforming the target motor torque into target currents expressed in a coordinate system fixed to the electrical angular frequency of the rotating rotor,
transforming target currents into target voltages expressed in a coordinate system fixed to the stator, and
transforming the target voltages into motor currents,
generating compensation voltages in at least one ripple compensation unit
and an adding operation to add the compensation voltages to the target voltages,
receiving the target motor torque from the steering controller and an electrical angular frequency of the rotor to transform the target motor torque into compensation currents expressed in a coordinate system fixed to the electrical angular frequency of a rotating part, which rotates n-times quicker than the electrical angular frequency of the rotating rotor,
transforming the compensation currents into compensation voltages expressed in a coordinate system fixed to the stator and output the compensation voltages to the adding operation.

In a preferred embodiment the compensation voltages are determined by
transforming the motor currents into a two-dimensional rotating reference frame (d-q) fixed to the rotor of the motor at n-times the frequency of the rotor position signal,
filtering the transformed motor currents with at least one low-pass filter,
comparing the filtered currents to look-up tables and if necessary adjusting the filtered currents according to the look-up tables and
transforming the resulting currents into the compensation voltages.

Preferably additional to the low pass filtering the DC-component of the current is also filtered to remove offsets. The low-pass filter also consists of one low-pass filter component for the d-component and one low-pass filter component for the q-component of the current.

Figure 1:
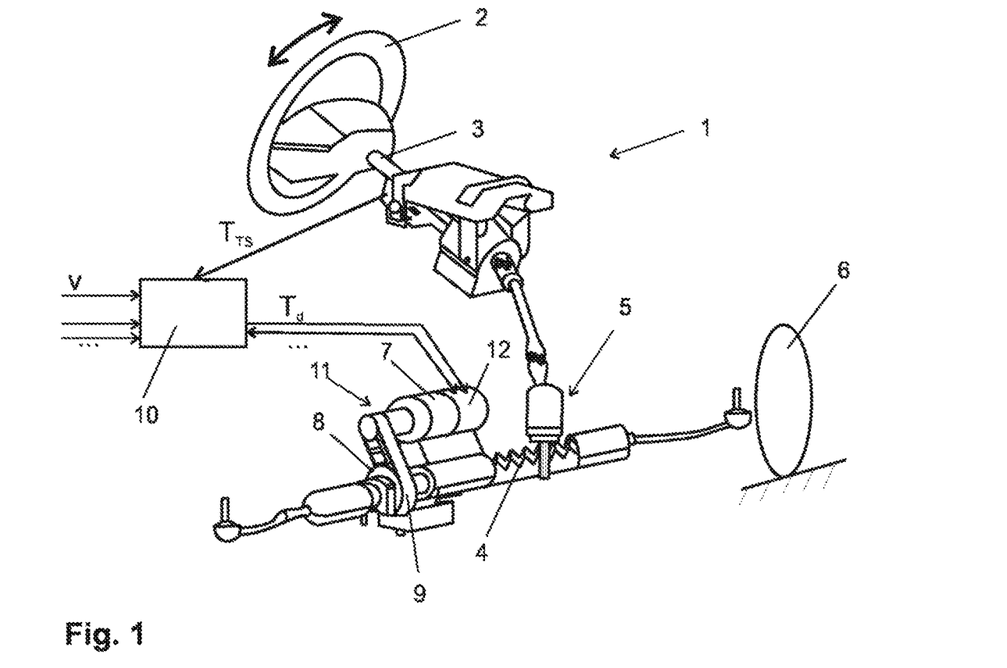
FIG. 1 is a schematic view of an example electric power steering apparatus.

FIG. 1 is a schematic diagram of an electric power steering apparatus 1. A steering wheel 2 is fixed to a steering shaft 3, and the steering shaft 3 is coupled to a rack 4 via a rack-and-pinion mechanism 5. Rotation of the steering shaft 3 accompanying a steering operation is converted into a reciprocating linear motion of the toothed rack 4 by the rack-and-pinion mechanism 5. The linear motion of the rack 4 changes the steering angle of the steered wheels 6. To provide steering assistance, an electric motor 7 mounted to the side of the rack housing drives a ball-screw mechanism 8 via a toothed rubber belt 9.

Electric power assist is provided through a steering controller 10 and a power assist actuator 11 comprising the electric motor 7 and a motor controller 13. The steering controller 10 receives signals representative of the vehicle velocity v and the torque $T_{TS}$ applied to the steering wheel 2 by the vehicle operator. In response to the vehicle velocity v, the operator torque $T_{TS}$, the controller 10 determines the target motor torque $T_d$ and provides the signal through to the motor controller 13, where the duty cycles are calculated to produce the phase currents via PWM (pulse-width modulation).

Figure 2:
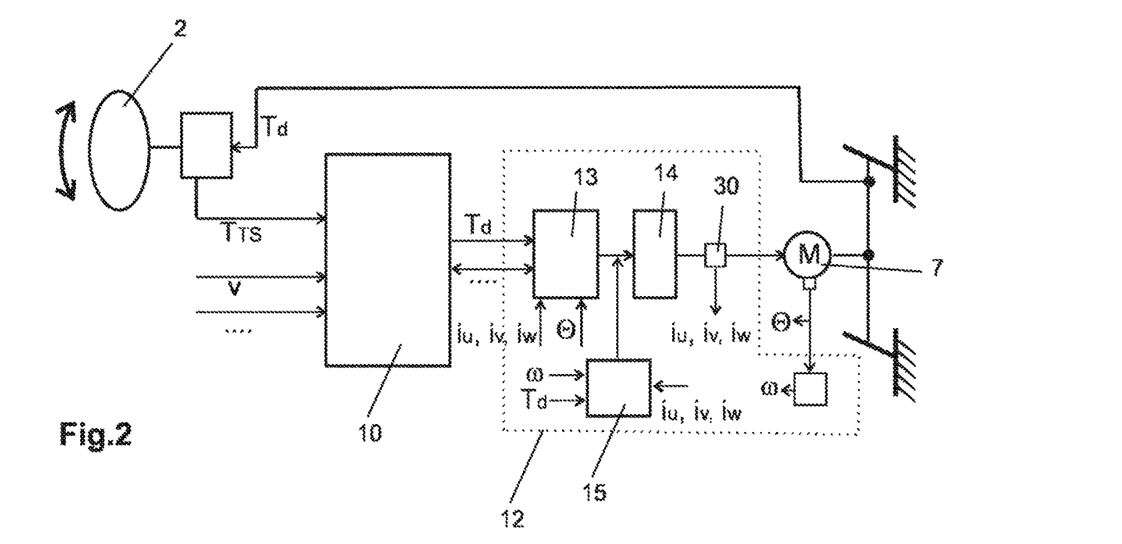
FIG. 2 is a block diagram of an example electrical structure of an example electric power steering apparatus.

FIG. 2 shows a block diagram of the electrical structure of the electric power steering apparatus 1. The steering controller 10 receives signals representative of the vehicle velocity v and the torque $T_{TS}$ applied to the steering wheel 2 by the vehicle operator and derives the target motor torque $T_d$. This torque is fed to the motor controller 13 which determines the voltage input for the PWM and a motor driver 14 generates via the PWM the motor currents $i_U$, $i_V$, $i_W$. For the ripple compensation an additional control unit 15 is present, wherein the motor currents $i_U$, $i_V$, $i_W$ are transformed with n-times electrical angular velocity ω, which compensates for the (n−1)-th harmonic current respective the (n−1)-th electric harmonic torque.

Figure 3:
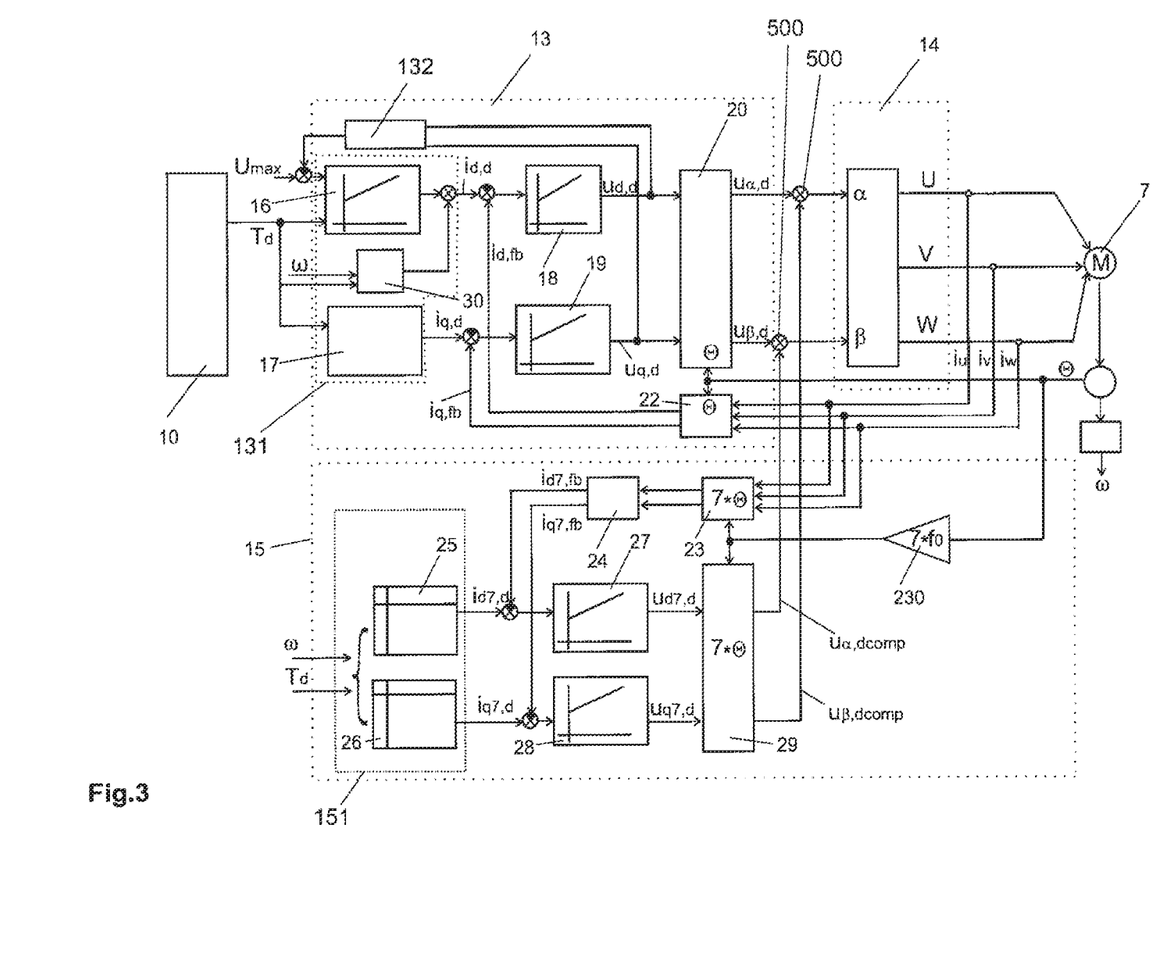
FIG. 3 is a block diagram showing in detail an example electrical structure.

The control flow-structure of the electric power steering apparatus 1 is shown in detail in FIG. 3. In this control flow-structure the power supply is not shown. Based on the target motor torque $T_d$ the target-currents $i_{d,d}$ and $i_{q,d}$ are determined by a first control portion 131 which comprises a PI controller 16, a unit 17 and an analytic field weakening part 30. The target currents $i_{d,d}$ and $i_{q,d}$ are responsible for motor voltage conditions and motor torque. They are expressed in the rotating reference frame (d-q) fixed to the rotor, rotating by electrical angular frequency ω of the rotor of the motor 7. The target currents $i_{d,d}$ and $i_{q,d}$ are then transferred via current controllers 18, 19 into target voltages $u_{q,d}$, $u_{d,d}$. A maximum voltage $U_{max}$ is used to avoid an electrical overload. In the voltage feed back portion 132 is calculated the square root of the sum of the quadratic $U_{d,d}$ and the quadratic $U_{q,d}$ as to sqrt $((U_{d,d})^2+(U_{q,d})^2)$. The current controllers 18, 19 calculate target voltages based on the current regulation loop error signal and current state of the controller. After the transfer into target voltages $u_{q,d}$, $u_{d,d}$, a coordinate transformation 20 converts the amounts expressed in rotating two-dimensional d-q coordinate system into amounts $u_{\alpha,d}$, $u_{\beta,d}$ expressed in a coordinate system fixed to the stator. In the next step voltages from the ripple compensation unit 15 are added to the target voltages $u_{\alpha,d}$, $u_{\beta,d}$ by adders 500, and the inverter 14, which can be a three-phase-inverter, transforms the resulting voltages into the three-phase-symmetrical coordinate system of the motor 7 and the inverter (14) transforms the voltages into motor currents $i_U$, $i_V$, $i_W$. These motor currents $i_U$, $i_V$, $i_W$ are on the one hand transformed into the two-dimensional coordinate system fixed to the electrical angular frequency of the rotor by a coordinate transformation 22 and they are as actual currents $i_{q,fb}$, $i_{d,fb}$ fed back into the main loop behind the PI controller 16 and the unit 17 as current feedback control. Parts of the motor currents $i_U$, $i_V$, $i_W$ are on the other hand fed into the ripple compensation unit 15. The motor currents $i_U$, $i_V$, $i_W$ are transformed in a coordinate transformation 23 into a two-dimensional rotating reference frame (7th d-q), which rotates synchronously with the seven times electrical angular frequency of rotor. In the example of FIG. 3, the ripple compensation works on the $6^{th}$ electrical harmonic. The d-q coordinate system resembles the fundamental harmonic, so to reach the $6^{th}$ harmonic in the toque the original and a six times higher frequency position signal is needed. Thus, the applied coordinate transformation is similar to the d-q transformation, however the position signal is not the actual rotor position but multiplied by seven according to the given $6^{th}$ harmonic, which means a frequency multiplication in the rotor position signal by a frequency multiplier 230. In other words the signal is transformed by seven times the angular frequency Θ.

After that a low-pass filter 24 damps other frequency contents of the phase currents and as a result a smooth DC value as feedback signal is left, which describes the amplitude and phase of the $7^{th}$ harmonic current. The resulting currents $i_{d7,fb}$, $i_{q7,fb}$ are then compared to look-up tables 25, 26 in which compensation reference signals are stored. The compensation reference signals are determined by FFT (Fast Fourier Transformation) analysis of the motor torque $6^{th}$ harmonic and give reference values, which eliminate the $6^{th}$ torque harmonic. The look-up tables are two dimensional in function of rotor speed and motor load. Column index is the value of the rotor mechanical speed in rpm, corresponding to the angular electrical frequency. The values for the column index can be 30 rpm, 100 rpm, 200 rpm, 400 rpm, 600 rpm, 800 rpm, 1000 rpm, 1200 rpm, 1400 rpm and/or can be defined between more than 5 elements between 50 and 2000 rpm. The row index is the target motor torque Td. As an alternative in the rows it could be also used the motor load (not shown). First row can for example take values of 0%, 25%, 50%, 75%, 100% of max torque. Between measured operation points linear interpolation is applied. Online-tuned band-pass filter or similar equipment are therefore not needed. After that two PI controllers 27, 28 convert the resulting current errors into voltages $u_{d,d}$, $u_{q,d}$. If needed the PI controllers 27, 28 can adjust the currents according to the look-up tables 25, 26. Finally another coordinate transformation 29 of the voltages into the stator fixed coordinate system is carried out. These stator fixed voltages $u\alpha_{,dcomp}$ $u_{\beta,dcomp}$ are then added to the voltages $u\alpha_{,d}$ $u_{\beta,d}$ of the main loop to compensate for the ripple induced by the $6^{th}$ harmonic by adders 500. Compensation regulators outputs can be limited to avoid disturbances. In the example the outputs are limited to +/−3%. Limits in the range from +/−1% to +/−6% are preferred. The resulting voltage vector has two components α and β; the fundamental harmonic which rotates synchronously with the rotor and a much smaller one which rotates at 7 times higher frequency. This results in two parallel regulation loops, which are separated from each other in frequency domain, hereby the fundamental loop has for example an approximate bandwidth between 0 Hz and 100 Hz while the compensation loop works for example in frequency range between 100 Hz and 1000 Hz.

Figure 4:
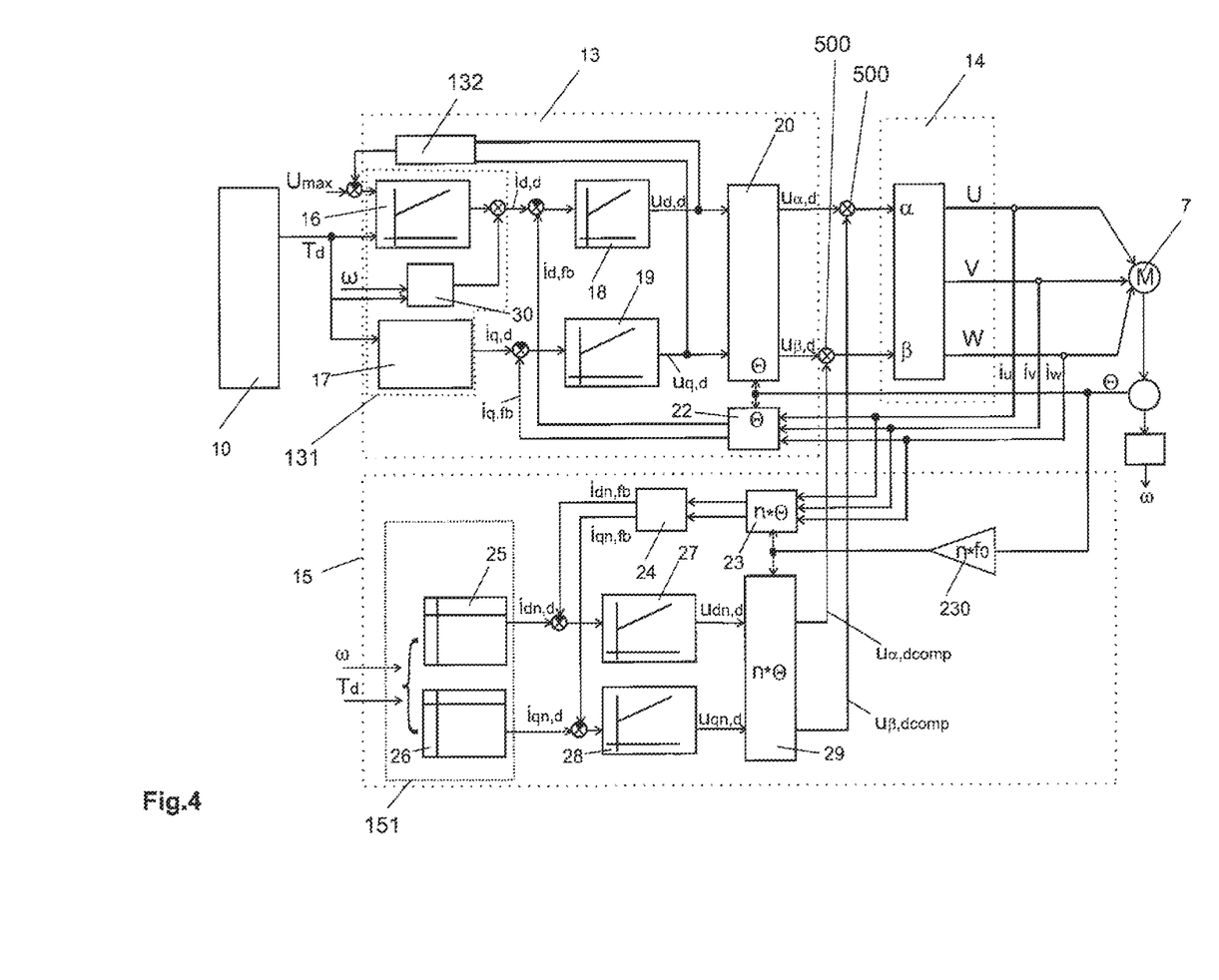
FIG. 4 is a block diagram of another example electrical structure of an example electric power steering apparatus.

The control flow-structure shown in FIG. 4 is identical to the basis control flow-structure shown in FIG. 3 except for the referred harmonic to be compensated. According to FIG. 3 the coordinate transformation transforms the motor currents in a coordinate transformation 23 into a two-dimensional rotating reference frame (n-th d-q), which rotates synchronously with the n-times electrical angular frequency of rotor. The look-up tables are specially adapted to the number n. "n" is a natural number. "n" could be seven like in the example as described in FIG. 3. The other features are analogous to the embodiment according FIG. 3.

In the d-q reference frame motor fundamental harmonic currents are shown as DC values. For eliminating or creating higher harmonic torque currents, higher frequency components have to be applied to the phases. These higher components are shown as AC values in the d-q reference frame and the frequency of these harmonic currents changes with the rotor speed. The ripple compensation unit 15 of FIG. 4 creates a rotating reference frame for any n-th harmonic current by coordinate transformation. In this n-th reference frame the n-th harmonic phase currents are expressed as DC value. The same PI current regulator structure is built up as for the fundamental harmonic. Outputs of compensation controllers are transformed back with the same position signal and compensation reference voltage are added to the main regulators reference voltages at the input of the inverter.

Figures 5, 6:
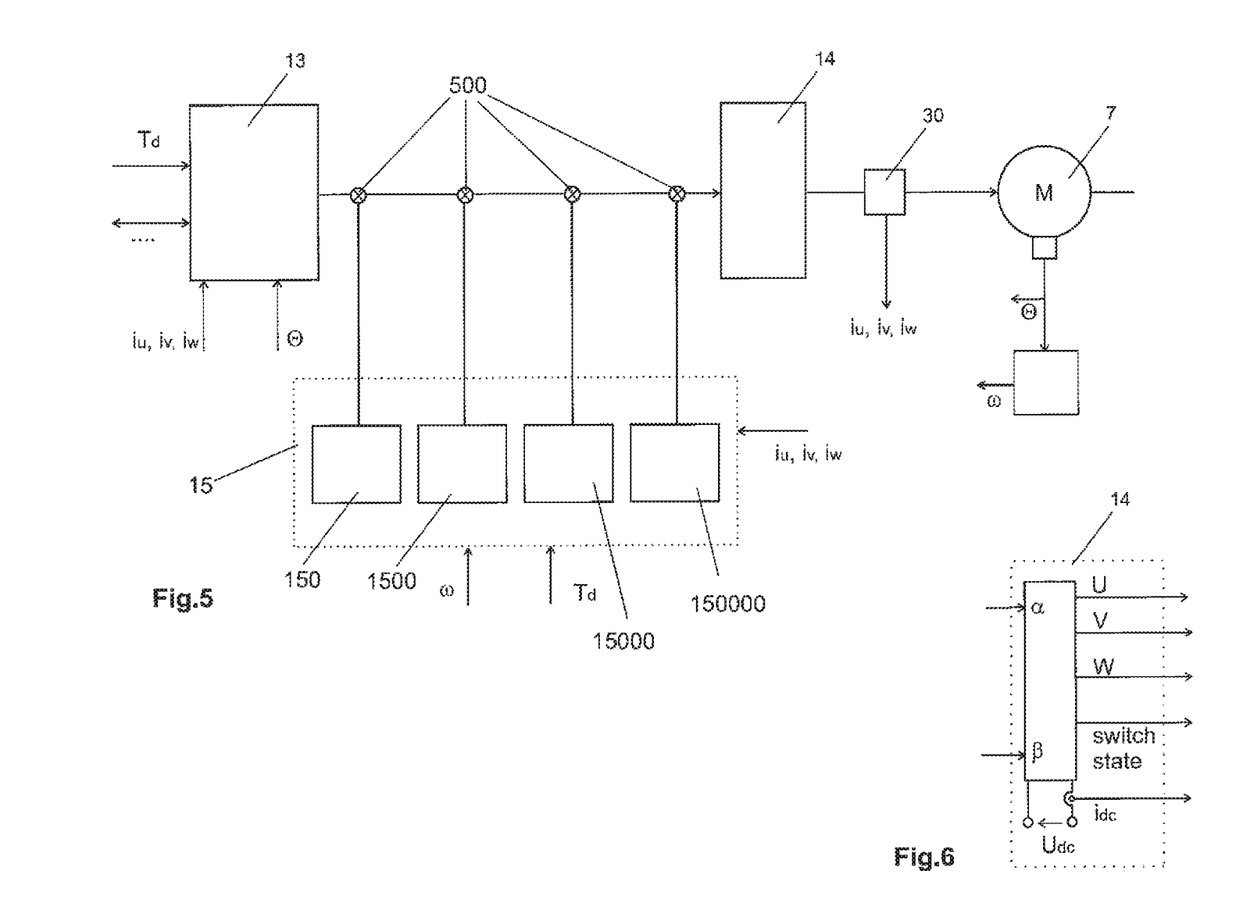
FIG. 5 is a block diagram of another example electrical structure of an example electric power steering apparatus.
FIG. 6 is a schematic view of an example inverter circuit.

As shown in FIG. 5 the ripple compensation can comprise more than just one ripple compensation unit 150, 1500, 15000, 150000, wherein each ripple compensation unit compensates for a specific harmonic, like the embodiments according FIG. 3 or FIG. 4. Each ripple compensation unit works like the embodiment of FIG. 3 or FIG. 4, but with a different number n for the coordinate transformation, thus eliminating several n−1-harmonics at the same time.

FIG. 6 shows the inverter circuit 14 of FIG. 3 or 4 with a single-shunt resistor technique utilizing only the information contained in the current flowing through the DC bus to reconstruct the tree-phase motor currents $i_U$, $i_V$, $i_W$. The most important reasons for the single-shunt three-phase reconstruction is cost reduction. In addition to cost benefits, the single-shunt algorithm allows the use of power modules that do not provide individual ground connection of each phase and the same circuit is being used to sense all three phases.

The low-pass filter 24 needs to be carefully implemented. In one embodiment the low-pass filter comprises two filters, a first low-pass filter that removes the mean value of fundamental d and q currents. After removal the n-th coordinate transformation is applied. This transformed signal contains the n-th harmonic amplitude as DC level and all other harmonic as AC level. With a second low-pass filter all other harmonic can be removed. Both filters are preferably simple first order low-pass filters with a 2-5 Hz corner frequency.

Furthermore, it is possible to actively cancel or create noise with a function generator. The function generator, e.g. saw-type function generator, creates a "virtual position signal" which can be used instead of the multiplied rotor position signal. In this case not a given harmonic can be compensated, but an arbitrary given frequency can be produced in or eliminated from the motor.

The present invention provides an electric power steering apparatus that easily and accurately reduces torque ripples and effectively suppresses generation of vibration and noise, without limiting the dynamic behaviour of the motor.

The new method uses the rotating coordinate system generated through a coordinate transformation fixed to the rotor n-th harmonic rotation. By using this reference frame, harmonic sinusoidal phase currents can be expressed as DC levels. Standard PI regulators can be used in the same way as they are used for fundamental harmonic. Since the compensation regulators work with DC levels, this method can highly extend the operation range up to about 1 kHz. Furthermore, compensation does only use about 4% of inverter voltage, so it can work even in the filed weakening region. The inventive electric power steering apparatus is not limited to 3-pole electric motors and can be applied for example to 4 or 5 pole pair motors as well. It is further not limited to the specific belt driven power steering assist system and can be used in electric power steering systems in general.

When above the coordinate transformation is described a transformation from a voltage to a current and vice versa is described. But all of these coordinate transformations can transform voltages into voltages. The currents will be a result from the electric circuit arrangement.

What is claimed is:

1. An electric power steering apparatus for assisting steering of a motor vehicle by conferring torque generated by an electric motor to a steering mechanism by a rotation of a rotor of the electric motor relative to a stator, the electric power steering apparatus comprising:
    a steering controller that receives signals representative of torque applied to a steering wheel and determines a target motor torque;
    a motor controller comprising a first control portion that receives the target motor torque from the steering controller and an electrical angular frequency of the rotor and transfers the target motor torque into target currents expressed in a coordinate system fixed to the electrical angular frequency of the rotating rotor, wherein the motor controller comprises a coordinate transformation portion to transfer the target currents into target voltages expressed in a coordinate system fixed to the stator;
    a ripple compensation unit that determines compensation voltages, the ripple compensation unit comprising
        a first ripple control portion that receives the target motor torque from the steering controller and the electrical angular frequency of the rotor to transfer the target motor torque into compensation currents expressed in a coordinate system fixed to a rotating part that rotates n-times faster than the electrical angular frequency of the rotating rotor, and
        a ripple coordinate transfer portion to transfer the compensation currents into the compensation voltages, which are expressed in the coordinate system fixed to the stator;
    an adder to add to the target voltages the compensation voltages output from the ripple coordinate transfer portion of the ripple compensation unit; and
    an inverter that transforms the target voltages into motor currents.

2. The electric power steering apparatus of claim 1 wherein the ripple compensation unit comprises a coordinate transformation that transforms the motor currents into a two-dimensional reference frame rotating at the n-times faster than the electrical angular frequency of the rotor.

3. The electric power steering apparatus of claim 1 wherein the ripple compensation unit comprises a low-pass filter.

4. The electric power steering apparatus of claim 1 wherein the ripple compensation unit comprises look-up tables that store compensation reference signals.

5. The electric power steering apparatus of claim 1 wherein the compensation currents are first compensation currents, wherein the ripple compensation unit converts second compensation currents into the compensation voltages expressed in the coordinate system fixed to the stator.

6. The electric power steering apparatus of claim 1 wherein the inverter comprises a single-shunt resistor for reconstructing the motor currents.

7. A method for compensating torque ripple in an electric power steering apparatus of a motor vehicle by using rotation of a rotor of a motor relative to a stator to support a steering operation, the method comprising:
    receiving a signal representative of a torque applied to a steering wheel;
    determining a target motor torque based on the received signal;
    transferring the target motor torque into target currents expressed in a coordinate system that is fixed to an electrical angular frequency of the rotating rotor;
    transferring the target currents into target voltages expressed in a coordinate system that is fixed to the stator;
    generating compensation voltages in a ripple compensation unit, whereby generating the compensation voltages comprises
        receiving the target motor torque and the electrical angular frequency of the rotor to transfer the target motor torque into compensation currents expressed in a coordinate system that is fixed to the electrical angular frequency of a rotating part rotating n-times faster than the electrical angular frequency of the rotating rotor, and
        transferring the compensation currents into the compensation voltages expressed in the coordinate system fixed to the stator;

adding the compensation voltages to the target voltages; and transforming the target voltages into motor currents.

8. The method of claim 7 further comprising determining the compensation voltages by
- transforming the motor currents into a two-dimensional rotating reference frame that is fixed to the rotor of the motor at the n-times faster than the electrical angular frequency of the rotating rotor;
- filtering the transformed motor currents with a low-pass filter;
- comparing the filtered motor currents to look-up tables and adjusting the filtered motor currents according to the look-up tables; and transforming the adjusted motor currents into the compensation voltages.

* * * * *